Dec. 22, 1936. E. C. RANEY Re. 20,212

REFRIGERATOR CONTROL

Original Filed April 29, 1932 2 Sheets-Sheet 1

Inventor

Estel C. Raney

By Faust G. Crampton

Attorney

Dec. 22, 1936. E. C. RANEY Re. 20,212

REFRIGERATOR CONTROL

Original Filed April 29, 1932 2 Sheets-Sheet 2

Inventor

Estel C. Raney

By Paul V. Crampton.

Attorney

Reissued Dec. 22, 1936

Re. 20,212

UNITED STATES PATENT OFFICE 20,212

REFRIGERATOR CONTROL

Estel C. Raney, Columbus, Ohio, assignor to Ranco Incorporated, Columbus, Ohio, a corporation of Ohio Original No. 1,877,967, dated September 20, 1932, Serial No. 608,159, April 29, 1932. Application for reissue October 30, 1932, Serial No. 695,936

32 Claims. (Cl. 62—4)

Figure 1:
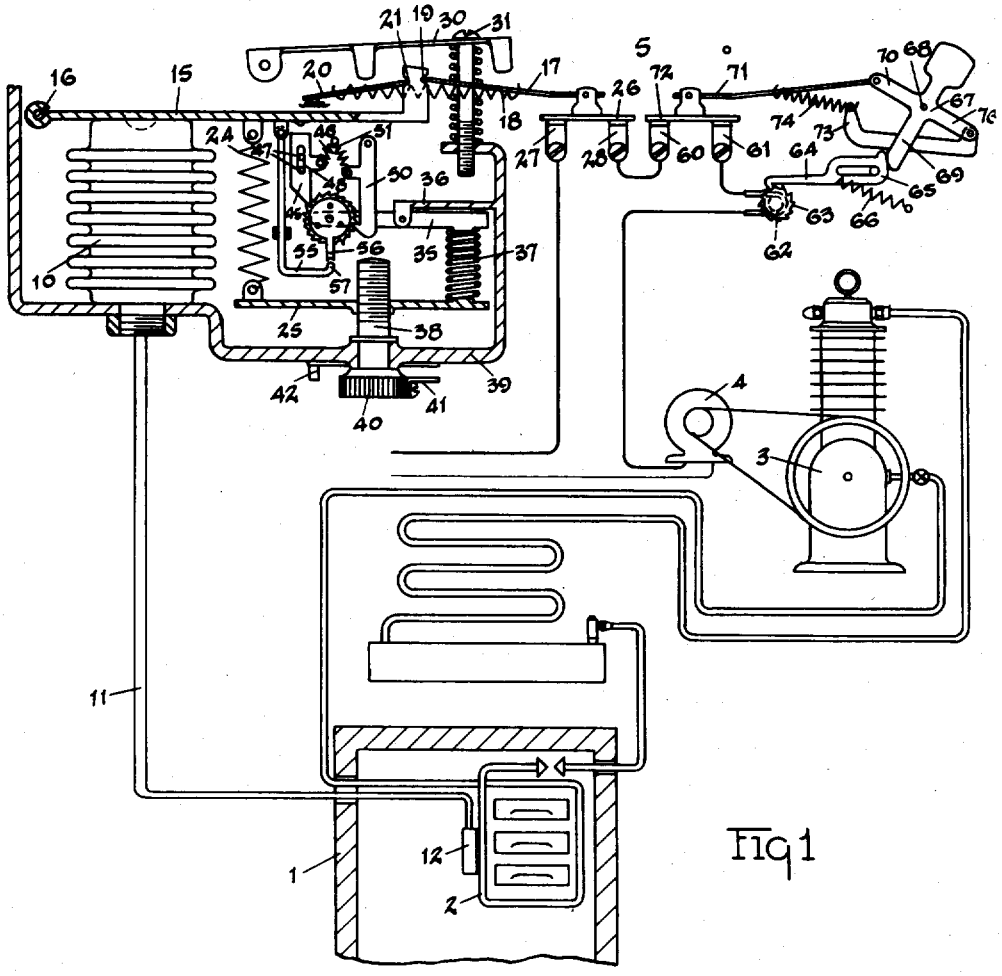

My invention relates to control systems for controlling the cyclic operations of refrigerators to produce periodic defrosting to prevent more than the formation of a slight amount of frost on the surfaces of the cooling units of refrigerators and thus produce a greatly increased refrigerating efficiency.

The object of the invention is to provide an automatic control device which not only maintains refrigerating temperatures at desired values, but also periodically raises the temperature of the cooling unit of the refrigerator sufficiently to defrost the refrigerator, and then restores it to the refrigerating temperatures. The invention also has for its object to provide a means for adjusting the refrigerating mean temperature without affecting the periodic defrosting temperature, the adjusting means being so compensated that the defrosting high temperature limit will remain practically constant regardless of the adjustment of the refrigerating temperature range of the refrigerator.

Thus, by my invention, I provide a defrosting means that will enable initiation of the defrosting cycle at a desired temperature and a means for adjusting the refrigerating temperatures without affecting the high temperature limit occurring at the end of the defrosting cycle. The invention thus provides means for raising the normal refrigerating upper temperature limit to a materially higher temperature and a compensating means whereby the said higher temperature limit remains at a practically fixed point regardless of the adjustment of the temperature limits of the normal-operating refrigerating cycle. It more particularly provides a defrosting means including switch closing resistant opposing means for causing the rise of the refrigerating temperature at which the switch is normally closed to a defrosting temperature and a member for inversely affecting the closure means of the switch to provide for the variation of the normal refrigerating temperature and yet maintain a substantially constant defrosting temperature.

My invention also provides a switch mechanism or means for opening and closing the circuit of the motor that drives the compressor of the refrigerator in response to the changes in the refrigerating and defrosting temperatures and also in response to the flow of a current which, if unduly continued, would injure the motor that drives the compressor of the refrigerating apparatus.

The invention also provides means whereby the circuit of a motor used to operate the compressor may be closed at desired temperatures and opened at a temperature lower than the selected temperature. The closing temperatures may be above or below 32 degrees F., or normal water freezing temperature. The opening and closing temperatures are maintained for periods of time separated by intervals during which the switch mechanism or means maintains the circuit open to permit a materially greater rise in temperature than that permitted during said periods. This is accomplished by a suitable resistant device that at intervals resists closing movements of the switch mechanism produced by a pressure device and enables removal of frost or water that gathers on the refrigerating unit.

The invention more particularly provides a pair of resistance devices, one or both of which are operable to resist the switch-closing movement of an electrically operated refrigerator, and means for adjusting the said resistance devices to produce the same proportionate change in the said resistance devices but in opposite degree by means of which a predetermined resistance to the switch-closing movement will be produced when both of the resistance devices operate to resist the switch closing movement, notwithstanding variations in the resistance to the switch closing movement when but one of the resistance devices operates alone to resist the switch closing movement. The invention thus provides means for normally maintaining the refrigerating temperature between adjustable temperature limits, and means for altering one of the said temperature limits to produce a predetermined abnormal temperature without affecting the other of the said temperature limits, and means for adjusting the normal refrigerating temperature without altering the predetermined abnormal temperature limit.

The invention also consists in the provision of other features that will appear from the following description and upon examination of the drawings. Structures and systems containing the invention may partake of different forms and still embody the invention. To illustrate a practical application of the invention, I have selected a system containing my invention, it being understood that variations may be made without departing from the spirit of the invention. The particular system and parts of the structure selected as illustrating an embodiment of my invention are described hereinafter and shown in the drawings.

Figure 2:
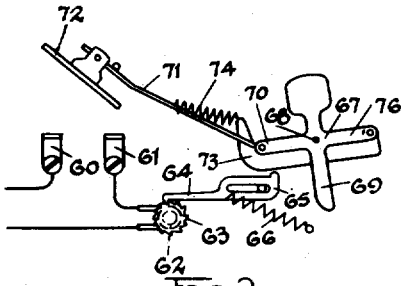
Figure 3:
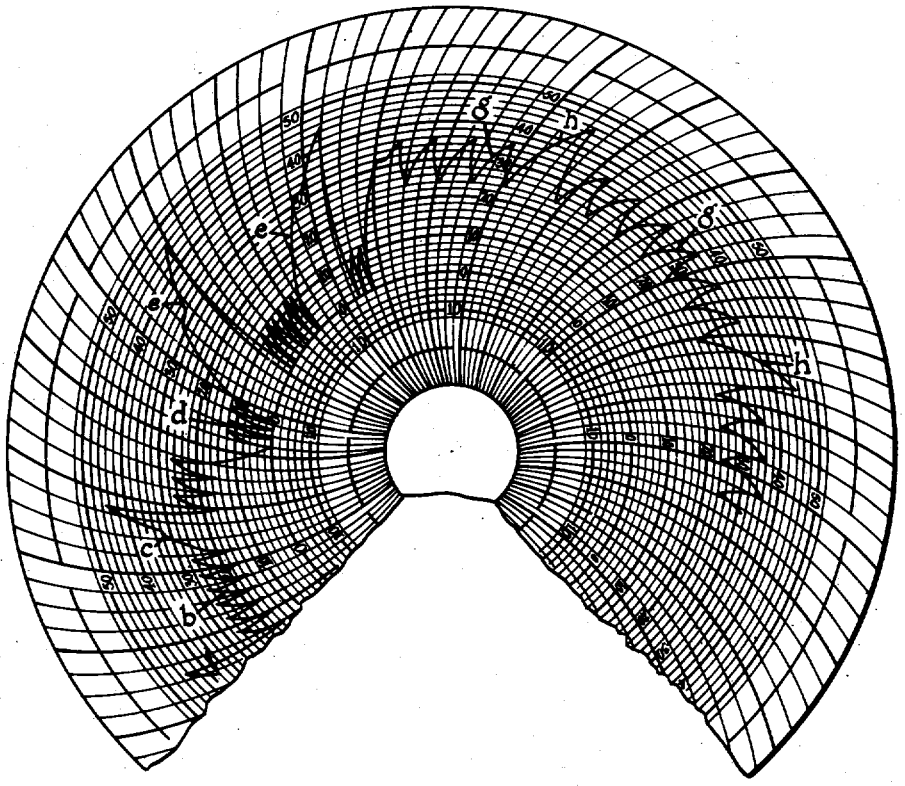

Fig. 1 illustrates the structure embodying the invention and shows diagrammatically the connections of the structure in a refrigerating apparatus. Fig. 2 illustrates parts of the switch mechanism for controlling the circuit of the motor and shows the relative location of the said parts when the switch is open. Fig. 3 illustrates in chart form the cyclic operation of the refrigerator during desired selected normal operations and also defrosting operations that are separated in their occurrence by a plurality of normal operations.

As shown diagrammatically in the drawings, a refrigerator 1 is provided with a cooling unit 2. A compressor 3 operates to circulate a refrigerant medium through the cooling unit 2 to reduce its temperature in the manner well known in the art. The compressor 3 is driven by a motor 4 that is subject to the control of a switch mechanism 5. The switch mechanism 5 is operated by the changes in temperature of the cooling unit 2 and by an excess flow of current through the motor 4.

The motor that drives the compressor of the refrigerating apparatus is controlled by the temperature produced by operation of the compressor and also by the flow of the current in the circuit of the motor. A bellows 10 is connected to a suitable bulb 12 by a tube 11 and they are filled with a suitable low boiling point fluid. The bulb 12 is located in close heat transferring relation with the cooling unit 2 of the refrigerating apparatus. The fluid in the bulb and in the bellows varies in pressure as the temperature of the portion located in the bulb changes. The pressure of the fluid in the bellows 10 operates through the lever 15 to open and close the switch mechanism 5. The lever 15 is pivotally supported on a suitable pin 16 and is provided with a snap switch arm 17 that is drawn by means of a spring 18 into a notch 19 formed on a part of the lever 15. The spring is also attached to a bar 20 that has one end located in a notch 21 formed in the lever 15. The spring 18 operates to hold the ends of the bars in the notches 19 and 21. When the pivoted ends of the bars, that is, the ends located in the notches 19 and 21, pass the spring 18, when moved in either direction, the spring 18 operates to open or close the switch mechanism 5.

To enable adjustment of the responsiveness of the bellows, a tension spring 24 is connected to the lever 15 and to a plate 25 so as to draw the lever 15 against the end of the bellows and to resist the expansive movement of the bellows. The plate 25 is adjusted to adjust the spring 24 to vary the pressure of the lever 15 on the bellows. A contact member 26, forming a part of the switch mechanism 5, is connected to one end of the bar 17 and is adapted to electrically connect the fixed contacts 27 and 28. When the lever 15 is depressed by the operation of the spring 24 upon the contraction of the bellows 1 to cause the pivot points of the bars 17 and 20 to pass the center of the spring 18, the circuit through the switch mechanism will be opened. Adjustment of the tension of the spring 24 adjusts the temperature at which the switch closes and at which the switch opens in as much as the spring 24 maintains a substantially constant pressure differential within the bellows between the closing and opening of the switch during the normal expansive and contractile movements of the bellows. The upward movements of the bars 17 and 20 are limited by suitable stops located on a pivoted arm 30. The position of the arm 30 may be adjusted by a screw 31 to locate the bars 17 and 20 in position so that when the lever 15 is raised and the pivot points of the bars 17 and 20 pass the center of the spring 18, the movable contact 26 will be snapped downwardly so as to close the circuit of the motor 4 that drives the compressor which circulates the refrigerant medium through the cooling unit 2 according to the temperature produced by the cooling unit.

By the repeated cyclic operations of the compressor, due to the opening and closing of the circuit of the motor, the moisture that condenses and freezes on the cooling unit 2 gradually accumulates as frost, and to defrost the cooling unit, I have provided means for periodically preventing closing of the circuit of the motor until the temperature of the cooling unit has raised sufficiently to cause the frost to melt thereby preventing accumulation of more than a film of frost.

To produce periodic defrosting I have provided means for periodically increasing the resistance to the expansive movement of the bellows at intervals separated by a predetermined number of cyclic refrigerating operations of the compressor and then restoring the control of the motor and the compressor to the refrigerating temperature control to produce the normal cyclic refrigerating operations. Increasing the resistance to the expansive movement of the bellows increases the pressure of the gas in the bellows required to move the lever 15 to operate the contact 26 and, consequently, the contact 26 will not close the circuit until the temperature of the cooling unit 2 rises to a point that corresponds to the total resistance to which the bellows is subjected. In order to produce an increased load on the bellows at intervals separated by a predetermined number of cyclic operations of the motor and the compressor, the lever 15 operates a member that is moved step by step, and when the member is moved to a certain point, it operates to connect a second resistant member to the lever 15 which cooperates with the spring 24 to resist movement of the lever 15 to close the circuit of the motor until the pressure on the bellows, and the temperature of the cooling unit rise to points higher than that at which the bellows will close the circuit when loaded only by the spring 24.

In the form of construction shown, a ratchet wheel 34 is rotatably supported on one end part of a lever 35. The lever 35 is pivotally supported on a bracket 36 and the compression spring 37 is disposed between the other end part of the lever 35 and the plate 25 to which the tension spring 24 is connected. The plate 25 is adjustably supported on a screw 38. The screw 38 is rotatably supported in a suitable frame or shell 39 and may be rotated by a knob 40 located on the outside of the shell. A suitable pointer 41 may be connected to the knob 40 and a stop 42 may be connected to the shell and in position to be engaged by the pointer for limiting the adjustment of the screw 38 by means of the knob 40. Further adjustment may be made by the removal of the pointer 41 from the knob 40, rotation of the screw and reconnection of the pointer to the knob at another point on the knob. Since the spring 24 is a tension spring, and the spring 37 is a compression spring, adjustment of the plate 25 operates to increase the pressure of one spring and decrease the pressure of the other spring, dependent upon the movement of the plate 25.

The ratchet wheel 34 is operated by means of a slidably supported pawl 45 that is spring pressed by means of the spring 46 that operates to raise the pawl 45. The pawl 45 is supported by means of a pair of pins 47 located in a slot 48 formed in the pawl 45. The pins 47 operate to limit the movements of the pawl 45 by the spring 46 in order to limit the movement of the ratchet wheel 34 so as to produce a uniform step movement each time that the pawl is depressed by the lever 15. The pawl completes its operation when the lever 15 reaches the completion of its downward stroke, that is, when it opens the circuit of the motor 4. This causes cessation of the operation of the compressor 3, and chilling of the cooling unit 2 immediately ceases. As the temperature of the cooling unit rises, the bellows 10 then expands and raises the lever 15, and the lever 15 moves from the pawl 45 when the pawl has been raised by the spring 46 against the lower stop pin 47. Preferably, a suitable catch pawl 50 operates to engage the teeth of the pawl 34 as it is stepped around by the movement of the pawl 45. The catch pawl 50 is also spring biased by means of a spring 51 to hold the ratchet 34 in the position to which it is turned by the operations of the lever 15.

In order to subject the switch opening movements of the lever 15 to the control of the ratchet 34, the lever 15 is provided with a link or pivoted arm 55, and the ratchet wheel 34 is provided with a projection 56 that at one point in the rotation of the ratchet wheel engages the projection 57 formed on the end of the arm 55. If desired, the end of the projection 56 may be made V-shaped to insure engagement of the projections 56 and 57 when the lever 15 is raised subsequent to their registration or alignment. When the arm 55 is thus engaged by the ratchet wheel, movement of the lever 15 is resisted by both of the springs 37 and 24. The pressure in the bellows 10 must then be increased to overcome the pressures of the springs 37 and 24 in order to close the circuit of the motor. This requires a corresponding rise in the temperature of the cooling unit. When the temperature rises to this point, the motor of the circuit is closed and the compressor lowers the temperature in the cooling unit of the refrigerator and the bellows contracts and the lever 15 descends. When the lever 15 descends to open the circuit of the motor, it operates the pawl 45 to move the projection 56 to one side of the projection 57 and consequently relieves the bellows from the control of the compression spring 37 and restores it to the control of the tension spring 24. The ratchet wheel is then stepped around until the projections 56 and 57 again register and the defrosting operation of the refrigerator is repeated.

The normal mean temperature of the refrigerator may be varied as may be desired by rotation of the knob 40 to vary the tension of the spring 24. This, however, correspondingly varies inversely the pressure of the spring 37 with the result that if the tension of the spring 24 is decreased or increased to lower or raise the normal mean temperature of the refrigerator, the high limit of the defrost temperature will remain substantially unchanged. As indicated in Fig. 3, the normal refrigerating cycles may be adjusted to produce switch operations at any desired temperature whereby the required coldness may be produced in the refrigerator. Fig. 3 indicates substantially the response to adjustments that may be made. The line indicating the cycles of the apparatus will vary according to operating conditions of the apparatus and the switch and according to room temperatures. The chart discloses the cycles *b* of normal operation wherein is produced switch opening at 15° Fahrenheit and switch closing at 27° Fahrenheit. The number of normal cycles that separates the defrosting cycles depends upon the number of the teeth of the ratchet wheel. Thus, eventually the defrosting cycle *c* is produced wherein the temperature rises to the switch closing temperature of 45°. A readjustment may be made to produce the cycles indicated at *d* wherein the operations of the apparatus are such as to produce switch operating temperatures at 0° and 12°. The normal cycles continue until the defrosting cycle is produced, as at *e*, wherein the temperature rises to the same defrosting temperature limit that was produced when defrosting during the cyclic operations *b* when a higher normal temperature was produced. Also adjustment may be made to produce switch opening at 24° and switch closing at 36° which produces an average temperature below 32° by the cycles indicated at *g*. Following the normal cycles of operations, the chilling element is again defrosted by raising the switch closing temperature to 45 as indicated at *h* notwithstanding the normal high temperature cycles. The chart indicates two extreme cyclic temperature operations of a refrigerator, namely between 0° and 12° and between 24° and 36° and an intermediate operation between 15° and 27° and defrosting cycles having substantially a constant temperature limit. Thus, the control may be adjusted to produce variations of the refrigerating temperature limits and the proper defrosting temperature occuring at separated intervals will be insured.

The switch mechanism 5 will not only maintain the refrigerating cyclic operations of the refrigerating apparatus and the periodic defrosting of the cooling unit, but also will protect the motor as against an overload. The switch mechanism 5 may be operated to open the circuit of the motor by the operation of an overload heat coil 62 which is connected in the circuit of the motor 4. The heat coil 62 surrounds a shell in which a fixed pin is inserted and on which is located a ratchet 63. The ratchet is held from rotation normally by a low temperature melting solder that interconnects the shell to the pin. When the heat of the coil 62 exceeds a predetermined value, the solder is melted so as to free the ratchet wheel and permit its rotation, in the manner well known in the art. The ratchet wheel is engaged by a pawl 64 connected to a slidable frame 65 that is subject to the tension of the spring 66 that operates to draw on the periphery of the ratchet wheel 63. When, therefore the ratchet wheel is liberated by the melting of the solder, the ratchet wheel 63 is rotated and the frame 65 is moved by the spring 66.

A lever 67 is pivotally supported by means of a pin 68 and has an arm 69 that is engaged by the frame 65 to rotate the lever 67. The lever also has an arm 70 to which is connected a bar 71 that carries a movable contact 72 that is adapted to electrically connect the contacts 60 and 61 to close the circuit of the motor. The bar 71 is connected to a rocker bar 73 by a spring 74 and the rocker bar is pivotally connected to the arm 76 of the lever 67. When, therefore, the frame 65 is released by releasement of the ratchet wheel 63, the lever 67 is rotated so as to lower one end of the bar 71 below the point of connection of the spring 74 with the rocker bar 73 and the spring 74 operates to raise the bar 71 and open the circuit of the motor at the points 60 and 61.

This operates to swing the arm 70 of the lever 67 against the rocker bar 73 and lift the end of the rocker bar 73 connected to the arm 76 of the lever 67. The parts may be restored when the heat coil 62 and the solder have cooled sufficiently to fixedly hold the ratchet wheel 63 by manually moving the lever 67. The arm 69 moves the frame 65 against the tension of the spring 63 and the arm 70 raises one end of the bar 71 to raise the said end of the bar 71 above the spring 74. The spring 74 then causes the contact 72 to snap against the fixed contacts and close the circuit of the motor between the points 60 and 61. Assuming that the temperature of the refrigerator has raised sufficiently to cause the bellows 10 to close the circuit of the motor between the points 27 and 28, the motor 4 will immediately start the operation of the compressor 3 to lower the temperature of the refrigerator.

Thus by my invention, I have provided a switch mechanism that will insure protection of the motor as against undue heating and injury and, at the same time, maintain efficient operation of the refrigerator and eliminate the inconvenience of constant attendance of the user to the defrosting operations.

I claim:

1. In a refrigerator control system, means for maintaining a normal operating refrigerating cycle between fixed temperature limits, means for periodically modifying the upper temperature limit, means for adjusting the temperature range of the normal operating cycle, a compensating means whereby the upper temperature limit of the periodic cycle remains at a practically fixed value regardless of adjustment of the normal operating cycle.

2. In a refrigerator control, a switch, a pressure means including a resistant member for operating the switch to normally maintain a substantially constant refrigerator temperature, a defrosting means including a resistant member for periodically raising the temperature at which the switch is closed by the pressure means, a member for inversely varying the effectiveness of the resistant members to vary the normal temperature of closing the switch by the pressure means and maintaining a substantially upper limit of defrosting temperature.

3. In a refrigerator control, a switch, a pressure means for operating the switch, means for periodically raising the refrigerating temperature at which the switch is closed and adjustable means for varying the temperature at which the pressure means operates the switch and maintaining substantially constant the periodic closing temperature of the switch.

4. In a refrigerator control, a switch, a pressure operated bellows for operating the switch, a resistance device for normally resisting the switch closing movement of the bellows, a second resistance device, means for periodically connecting the second resistance device to further resist the switch closing movement of the bellows, and means for adjusting the said resistance devices to produce the same proportionate change in opposite degree in each of the said resistance devices.

5. In a refrigerator, a switch, a pressure operated bellows for operating the switch, a ratchet wheel, means including a spring for yieldingly supporting the ratchet wheel for rotatable movements and movements transverse to the axis of rotation of the wheel, a pawl connected to the switch for rotating the ratchet wheel, the ratchet wheel having a part engaged by the switch at a point in its rotation for resisting closing movements of the switch by the bellows.

6. In a refrigerator control, a compressor motor, a switch for controlling the circuit of the compressor motor, a pressure operated bellows for operating the switch, a pivoted arm, a ratchet wheel rotatably supported on the arm, a spring for resisting the movement of the arm, a pawl connected to the switch for moving the ratchet wheel step by step by opening movements of the switch, the ratchet having a part engaged by the switch to produce movement of the arm that is resisted by the spring upon a closing movement of the switch.

7. In a refrigerator control, a compressor motor, a switch for controlling the circuit of the compressor motor, a pressure operated bellows, a spring for resisting the movements of the bellows, a pivoted arm, a spring for resisting the movement of the arm, a ratchet wheel rotatably supported on the arm, a pawl connected to the switch for moving the ratchet wheel step by step by opening movements of the switch, the ratchet wheel having a part engaged by the switch to produce movement of the arm that is resisted by the second named spring upon a switch closing movement of the bellows, and an adjustable member for increasing the effectiveness of one spring and decreasing the effectiveness of the other spring.

8. In a refrigerator control, a compressor motor, a means for automatically opening the circuit of the motor upon flow of an excess current through the motor and also at a predetermined low refrigerator temperature, and means for closing the circuit at a predetermined high refrigerator temperature, and means periodically operated for preventing the operation of the last named means until the refrigerator is defrosted.

9. In a refrigerator control, a compressor motor, a means for automatically opening the circuit of the motor upon flow of an excess current through the motor and also at a predetermined low refrigerator temperature and means for closing the circuit at a predetermined high refrigerator temperature, and means periodically operated for preventing the operation of the last named means until the refrigerator is defrosted and an adjustable member for varying the high temperature circuit closing means and maintaining the high limit of the refrigerator defrosting temperature substantially constant.

10. In a refrigerator control, a compressor motor, a manually operated means for opening and closing the circuit of the motor and having an automatic means for opening the circuit of the motor upon the flow of an excess current and also at a predetermined low refrigerator temperature and a means for closing the circuit at a predetermined high refrigerating temperature to produce a plurality of normal refrigerating cycles, and a periodically operated means for retaining the circuit open to raise the refrigerator temperature to a predetermined defrosting value and restoring the temperature to the said normal operating cycle.

11. In a refrigerator control, a compressor motor, means for controlling the compressor motor and comprising a switch means actuated by an excess current through the motor and predetermined low and high refrigerator temperatures, the control having means for raising the temperature to defrost the refrigerator, and an adjustable means for varying the normal refrigerator temperature and for maintaining the periodic high defrosting temperature substantially constant.

12. In a refrigerator control, a compressor motor, a circuit control means for controlling the circuit of the motor, a pressure means for operating the circuit control means at predetermined points of pressure to maintain normally predetermined refrigerating temperature limits, means for periodically actuating the circuit control means for raising the higher temperature limit without affecting the lower temperature limit for defrosting the refrigerator, and means for adjusting the pressure means to alter the normal predetermined temperature limits to other normal refrigerating temperature limits and maintaining substantially constant the higher periodic refrigerating temperature limit for defrosting the refrigerator.

13. A refrigerating system comprising means for starting and stopping a refrigerator at definite temperature limits successively for a predetermined number of cycles, an automatic means for increasing the starting temperature to a defrosting temperature for a defrosting cycle after the said predetermined number of cycles, means whereby the temperature range of the said successive cycles may be readily adjusted without changing the upper temperature limit of the defrosting cycle.

14. In a refrigerator, a switch, a pressure operated bellows for operating the switch, a ratchet wheel, means including a spring for yieldingly supporting the ratchet wheel for rotatable movements and movements transverse to the axis of rotation of the wheel, the spring operating to resist the transverse movements of the ratchet wheel, a pawl connected to the switch for rotating the ratchet wheel, the ratchet wheel having a part engaged by the switch at a point in its rotation to move the ratchet wheel transverse to the axis of rotation of the ratchet wheel, the spring operating to resist closing movements of the switch by the bellows.

15. In a refrigerator control, means for opening an electric circuit at a predetermined temperature and means for closing the circuit at a predetermined temperature below 32 degrees Fahrenheit the said means operating a predetermined number of times to close and open the circuit and means for closing the circuit during a single operation at a temperature in excess of 32 degrees Fahrenheit and means for varying the opening and closing temperatures below 32 degrees Fahrenheit without changing materially the circuit closing temperature above 32 degrees Fahrenheit.

16. In a refrigerator control system means for maintaining a normal operating refrigerating cycle between fixed temperature limits, means for adjusting the temperature range of the normal operating cycle, means for raising the upper temperature limit of the normal cycle to a materially higher temperature, a compensating means whereby the said higher temperature remains at a practically fixed value regardless of the adjustment of the normal operating refrigerating temperature.

17. In a refrigerator control, a switch, a pressure means including a resistant member for operating the switch to produce a desired normal refrigerating temperature, a defrosting means including a resistant member for raising the temperature at which the switch is closed by the pressure means to a defrosting temperature and a member for varying the effectiveness of the resistant members to vary the normal refrigerating temperature of closing the switch by the pressure means and maintaining a substantially constant defrosting temperature.

18. In a refrigerator control, a switch, a pressure operated bellows for operating the switch, a resistance device for normally resisting the switch closing movement of the bellows, a second resistance device, means for engaging the second resistance device to further resist the switch closing movement of the bellows, and means for adjusting the said resistance devices to produce the same proportionate change in opposite degree in each of the said resistance devices.

19. In a refrigerator control, a compressor motor, a circuit control means for controlling the circuit of the motor, a pressure means for operating the circuit control means at predetermined points of pressure to maintain normally predetermined refrigerating temperature limits, means for raising the higher temperature limit for defrosting the refrigerator without affecting the lower temperature limit, and means for adjusting the pressure means to alter the normal refrigerating temperature limits to other normal refrigerating temperature limits and maintaining the higher defrosting temperature limit substantially constant.

20. A refrigerating system comprising in combination, a cooling element normally maintained between desired temperatures limits, means for raising the high normal temperature limit of the cooling element to a defrosting temperature and means for varying the higher normal temperature limit while maintaining the upper limit of the defrosting temperature of the cooling element constant regardless of the variation of the higher normal temperature limit.

21. In a refrigerating apparatus, means for producing a plurality of cycles of operation, means for limiting the operations of the apparatus between normal refrigerating temperature limits, and means for maintaining the apparatus between a defrosting temperature limit and the low normal temperature limit, and means for varying the normal refrigerating temperature limits while maintaining the high defrosting temperature limit constant.

22. In a thermostatic control for controlling refrigerators, means for normally maintaining operating cycles between fixed temperature limits, means for adjusting the temperature limits of said operating cycles, means for producing a higher temperature limit for a defrosting cycle, and means whereby the higher temperature limit of the defrosting cycle remains substantially constant regardless of the adjustment of the normal operating cycle.

23. In a thermostatic control for controlling cyclic operating heat transferring devices, means for adjusting the temperature limits of the normally maintained cycles, means for temporarily changing a temperature limit of the normally maintained operating cycles, and means whereby the temperature to which the said normal temperature limit is changed remains at a substantially fixed value regardless of adjustment of the temperature limits of the normal operating cycles.

24. In a thermostatic control for controlling refrigerators, means for normally maintaining operating cycles between fixed temperature limits, means for varying the temperature limits of said normally operating cycles, means for modifying the upper temperature limit of the normal operating cycles to produce a defrosting cycle, means whereby the upper temperature limit of the defrosting cycle remains at a practically fixed value regardless of the adjustment of the temperature limits of the normal operating cycles, and automatic means for restoring the normal operating cycles upon completion of the defrosting cycle.

25. In a pressure responsive control for controlling cyclic operating pressure producing devices, means for normally maintaining operating cycles between fixed pressure limits, means for adjusting the pressure limits of the said normal operating cycles, means for temporarily changing a pressure limit of the normal operating cycles, and means whereby the pressure to which the normal pressure limit is changed remains at a substantially fixed value regardless of the adjustment of the pressure limits of the normal operating cycles.

26. In a thermostatic control for heat transferring device, means for normally maintaining operating cycles between fixed temperature limits, means for varying the temperature limits of said normal operating cycles, means for temporarily changing a temperature limit of the normally maintained operating cycles, means whereby the temperature to which the normal temperature limit is changed remains at a substantially fixed value regardless of adjustment of the normal operating cycles, and means for automatically restoring the said device to the normal operating cycles upon completion of the cycle produced by the changing of the temperature limit of the normal cycles.

27. In a refrigerator control, a switch, a pressure means for operating the switch to produce a normal operating refrigerating temperature between predetermined limits, means for adjustably varying the normal operating refrigerating temperature limits, means for raising the higher normal temperature limit to a temperature point above the said higher limit and for returning the upper temperature limit from said point to the normal operating refrigerating temperature limit and means for maintaining the said temperature point substantially constant notwithstanding the adjustable variation of the normal operating refrigerating temperature.

28. A refrigerating system, comprising means for normally producing temperatures between adjustable limits, means for altering one of the temperature limits to produce a predetermined abnormal temperature limit materially different from the one altered without affecting the other of the said normal temperature limits and means for adjusting the normal refrigerating temperature limits without altering the predetermined abnormal temperature.

29. In a refrigerating apparatus, controlling means for limiting the operation of the apparatus to produce a refrigerating temperature between certain normal temperature limits, means for altering one of the normal temperature limits to produce a predetermined temperature point materially remote from the said normal temperature limits and to produce operation of the apparatus between the other of the normal temperature limits and the said predetermined temperature point, means for adjusting the normal refrigerating temperature limits, and means for maintaining the said predetermined temperature point substantially constant regardless of the adjustment of the normal refrigerating temperature limits.

30. In a refrigerator control defroster, means for opening an electric circuit at a predetermined temperature below 32 degrees Fahrenheit and means for closing the circuit at a predetermined temperature above 32 degrees Fahrenheit, and means for varying the opening temperatures below 32 degrees Fahrenheit without changing materially the circuit closing temperature above 32 degrees Fahrenheit.

31. In a thermostatic control for controlling cyclic operating heat transferring devices; means for adjusting a temperature limit of the normally maintained operating cycles; means for temporarily changing a temperature limit of the normally maintained operating cycle; and means whereby the temperature to which the said normal temperature limit is changed remains at substantially fixed value regardless of the adjustment of first means.

32. In a refrigerator control system, means for maintaining a normal operating refrigerating cycle between fixed temperature limits; means for adjusting one of said temperature limits; and means operable, when the second mentioned means is in any of its adjusted positions, for temporarily causing one of the temperature limits to be changed to a fixed value regardless of the position of the second mentioned means.

ESTEL C. RANEY.